March 28, 1961  L. C. SUTHERLAND  2,976,540
PHYSICIAN'S EXAMINATION HAND MITT
Filed July 12, 1956
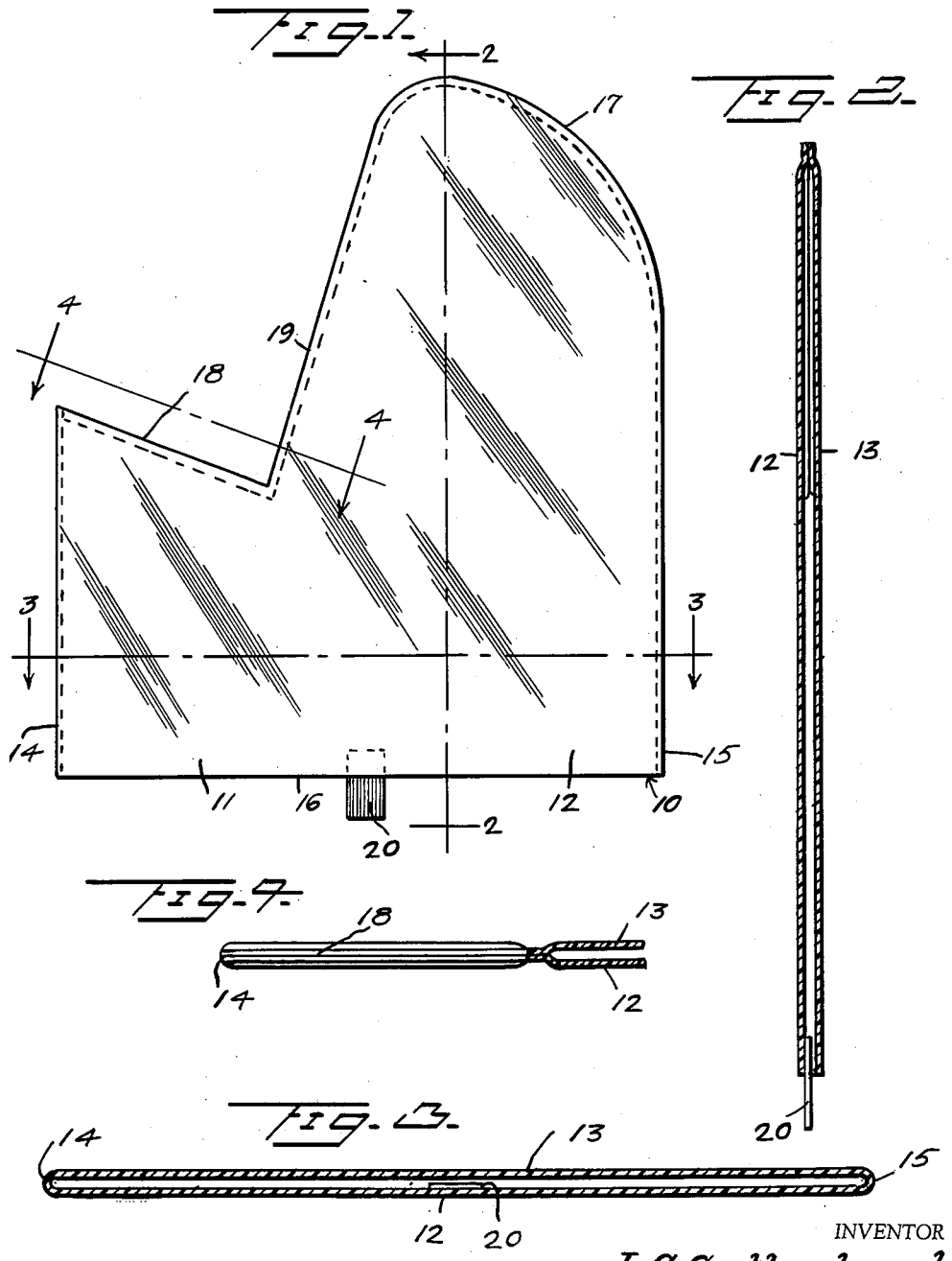
INVENTOR
L.C. Sutherland
BY Kimmel & Crowell
ATTORNEYS

United States Patent Office 2,976,540
Patented Mar. 28, 1961

2,976,540

PHYSICIAN'S EXAMINATION HAND MITT

Lyndon C. Sutherland, 118 Congress St., Rushville, Ill.

Filed July 12, 1956, Ser. No. 597,462

1 Claim. (Cl. 2—161)

The present invention relates to physician's examination hand coverings, and more particularly to hand mitts which are adapted to protect the hand and the body of the patient during examinations.

The primary object of the invention is to provide an inexpensive disposable single use mitt to cover the hand of the physician during vaginal examinations.

Another object of the invention is to provide a hand mitt for physician's examination use which is sufficiently inexpensive to permit a single use to be efficiently made thereof.

A further object of the invention is to provide a physician's mitt of the class described above which can be formed in a plurality of sizes and which is constructed of a plastic material to form a complete barrier to the passage of bacteria therethrough.

A still further object of the invention is to provide a physician's hand covering which is extremely inexpensive to manufacture, simple to use, and completely effective in its action.

Other objects and advantages will become apparent in the following specification when considered in the light of the attached drawings, in which:

Figure 1 is a side elevation of the invention.

Figure 2 is a vertical cross-section taken along the line 2—2 of Figure 1, looking in the direction of the arrows.

Figure 3 is a horizontal cross-section taken along the line 3—3 of Figure 1, looking in the direction of the arrows.

Figure 4 is a fragmentary transverse cross-section taken along the line 4—4 of Figure 1, looking in the direction of the arrows.

Referring now to the drawings in detail wherein like reference characters indicate like parts throughout the several figures, the reference numeral 10 indicates generally my improved physician's mitt which is formed of a tubular body of plastic 11 arranged as a front panel 12 and a rear panel 13 joined along opposite fold lines 14 and 15, as viewed particularly in Figure 3.

The tubular body 11 terminates in one end in a relatively straight line 16 and has an arcuate end portion 17 extending partially across the mitt 10. The mitt 10 is cut away on a line 18 sloping downwardly and inwardly from the fold line 14 toward the fold line 15. The inner end of the line 18 and the inner end of the arcuate edge 17 are joined by a line 19 extending angularly in a general longitudinal line of the mitt 10.

The arcuate edge 17, the line 19, and the line 18 terminating the end of the mitt 10 opposite the edge 16 are each heat sealed to the corresponding edges of the panel 13 so that the mitt 10 is open only along the line or edge 16 thereof.

An identifying tab 20 is secured to the panel 12 and is colored to identify the size of the mitt 10. The tab 20 is useful as a handle to put on and remove the mitt 10 without contacting the surfaces of the panels 12 and 13.

In the use and operation of the invention, the hand of the operator is positioned between the panels 12 and 13 with the fingers extending toward the arcuate edge 17 and the thumb extending toward the intersection of the fold line 14 and the line 18. Upon completion of the vaginal examination, during which period the physician's hand as well as the vaginal area are completely protected from bacterial contamination one from the other, the mitt 10 is removed by grasping the tab 20 and peeling the mitt from the hand.

Having thus described the preferred embodiment of the invention, it should be understood that numerous structural modifications and adaptations may be resorted to without departing from the scope of the appended claim.

What is claimed is:

A physician's examination hand mitt comprising a one-piece seamless tubular body, said body being generally flat with opposed straight parallel smooth seamless edge portions, said tubular body being heat sealed together at one end, said one end being cut along an arcuate line and a straight line inclined relative to the parallel edge portions to form a relatively wide finger portion adapted to encompass all the fingers, said inclined line terminating in an acutely angled straight edge portion forming the top edge of a narrower thumb portion, one of said straight parallel edge portions forming the end of said thumb portion, the other end of said tubular body being open and of a width equal to the maximum width of said body, and a tab centrally secured to one side of said body adjacent the open end and extending beyond said end to facilitate removal of said mitt, said tab and said open end equal to the maximum width of the mitt permitting removal of the mitt after use without touching the soiled outer surface of said mitt.

References Cited in the file of this patent

UNITED STATES PATENTS

| | | |
|---|---|---|
| 2,325,482 | Curran | June 27, 1943 |
| 2,445,987 | Ashman | July 27, 1948 |
| 2,670,473 | Stebic | Mar. 2, 1954 |
| 2,773,264 | Nover | Dec. 11, 1956 |